United States Patent [19]

Muller

[11] Patent Number: 4,580,037
[45] Date of Patent: Apr. 1, 1986

[54] ELECTRICALLY OPERATED HEATED ELEMENT WITH A FLOW CHANNEL FOR MOLTEN PLASTIC

[75] Inventor: Walter Muller, Battenberg, Fed. Rep. of Germany

[73] Assignee: EWIKON Entwidklung Konstruktion GmbH & Co KG, Herford, Fed. Rep. of Germany

[21] Appl. No.: 653,989

[22] Filed: Sep. 24, 1984

[30] Foreign Application Priority Data

Sep. 29, 1983 [DE] Fed. Rep. of Germany ....... 3335279

[51] Int. Cl.[4] .............................................. F27B 14/06
[52] U.S. Cl. .................................... 219/421; 219/424; 219/530; 219/541; 222/146.5; 425/549
[58] Field of Search ............... 219/421, 424, 437, 439, 219/523, 530, 541, 544; 222/146 HE; 425/144, 551, 549, 566, 568, 548

[56] References Cited

U.S. PATENT DOCUMENTS 4,238,671  12/1980  Gellert ................................ 219/421
4,279,588   7/1981  Gellert ................................ 425/568

Primary Examiner—Volodymyr Y. Mayewsky
Attorney, Agent, or Firm—Sprung Horn Kramer & Woods

[57] ABSTRACT

The heating element has a heat conductor in the form of a metal tube. The molten plastic is conveyed to the tube through an inflow aperture. The end of the tube that is remote from the inflow aperture is shaped into a point and has flowthrough apertures. The tube is welded in the vicinity of the point to an outer jacket made out of a material with a low specific electric resistance. Outside the welding point, there is a layer of insulation between the tube and the outer jacket. The layer is between 0.1 and 0.5 mm thick and can be made out of ceramic. The electric energy supplied to the tube is so low that the molten plastic is not subjected to thermal overload in the vicinity of the point.

6 Claims, 5 Drawing Figures

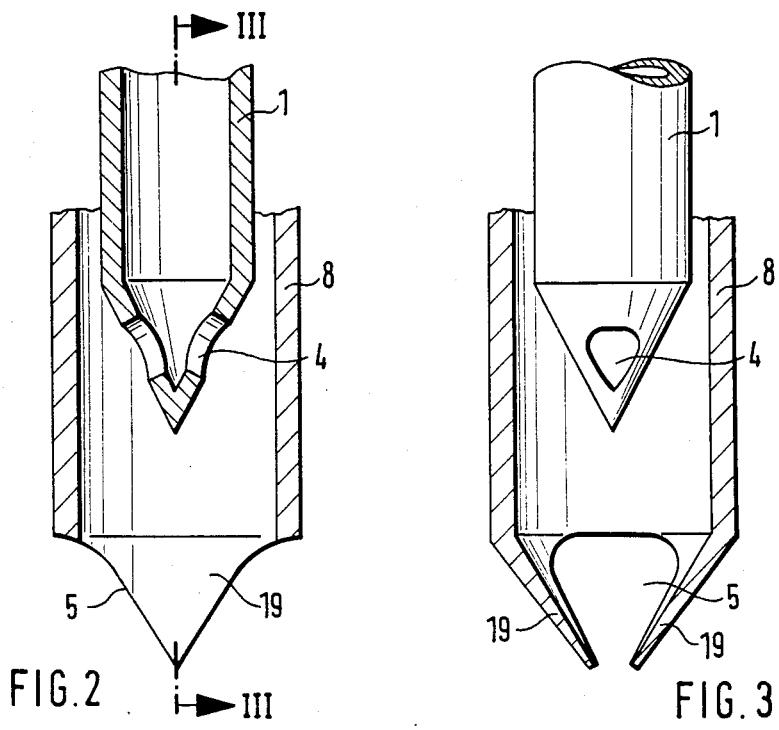
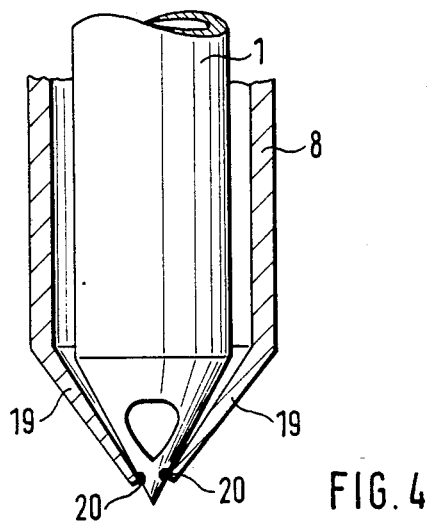
FIG. 2
FIG. 3
FIG. 4

ELECTRICALLY OPERATED HEATED ELEMENT WITH A FLOW CHANNEL FOR MOLTEN PLASTIC

BACKGROUND OF THE INVENTION

The present invention relates to an electrically operated heating element with a flow channel for molten plastic and a central hot rod that is connected to an outer jacket at the downstream end of the heating element, said end being provided with outflow apertures.

An electrically operated heating element of this type is known from U.S. Pat. No. 4,285,660. The hot rod is connected at its point to the outer jacket by means of webs that demarcate one or more exit apertures for the molten plastic coming from the annular flow channel. There is a section between the point and the shaft of the hot rod that has an extensive area wetted by the molten plastic emerging in the vicinity of the exit apertures. The maximum cross-section of the section is equal to or greater than that of the shaft of the rod.

The flow channel for the molten plastic in this heating element is demarcated by the central hot rod and by the outer jacket of the heating element. The cross-section of the heating element is composed of the cross-section of the hot rod, of the annular flow channel, and of the outer jacket.

An electrically operated heating element that is immersed in the hot runner that conveys the molten plastic in a hot-runner tool is also known from U.S. Pat. No. 3,520,026. That heating element has a central metal core that is connected at the end remote from the electric connection with a metal outer jacket. A layer of insulation is positioned outside of the point of connection and between the metal core and the outer jacket.

The metal core is made out of copper or a similar material and has a low effective electric resistance, whereas the outer jacket is made out of a metal with a high effective electric resistance. Thus there is a high partial voltage at the outer jacket. Since the metal core has a large cross-section, the total cross-section of the heating element is correspondingly large.

SUMMARY OF THE INVENTION

The object of the present invention is to provide a heating element of the aforesaid type that has a small cross-section and wherein the flow resistances in the flow channel are low and the flow of the molten plastic is extensively laminar.

This object is attained in accordance with the invention in that the hot rod is a metal tube that demarcates a flow channel and has outflow apertures at its downstream end in the vicnity of a point, in that the outer jacket is made out of a material with low specific and effective electric resistances, and in that there is a layer of insulation between the outer jacket and the tube.

In one practical embodiment of the invention the layer of insulation between the outer jacket and the metal tube is between 0.1 and 0.5 mm thick. The insulation can be ceramic.

The tube that demarcates the flow channel and is made out of a material with a high specific electric resistance preferably has the same cross-section over its total length, tapering into a point only in the vicinity of its downstream end, in which there are outlfow apertures.

Since the metal tube or heat conductor is embedded in a layer of insulation and in a metal outer jacket, it loses no heat. The tubular heat conductor can accordingly be operated at very low electric power. Thus, the molten plastic is not subjected to any thermal overload at the point where the metal tube is welded to the metal outer jacket. The tubular heat conductor is supplied with electric energy at the circumference as dictated by the conditions necessitated by the particular type of molten plastic in the vicinity of the point and hence of the outflow apertures.

A preferred embodiment of the invention will now be described with reference to the attached drawings, wherein

BRIEF DESCRIPTION OF THE DRAWINGS

FIGS. 2 through 4 illustrate stages in establishing a welded connection between the metal tube or heat conductor and the outer jacket of the heating element.

DETAILED DESCRIPTION OF THE PREFERRED EMBODIMENT

Figure 1:
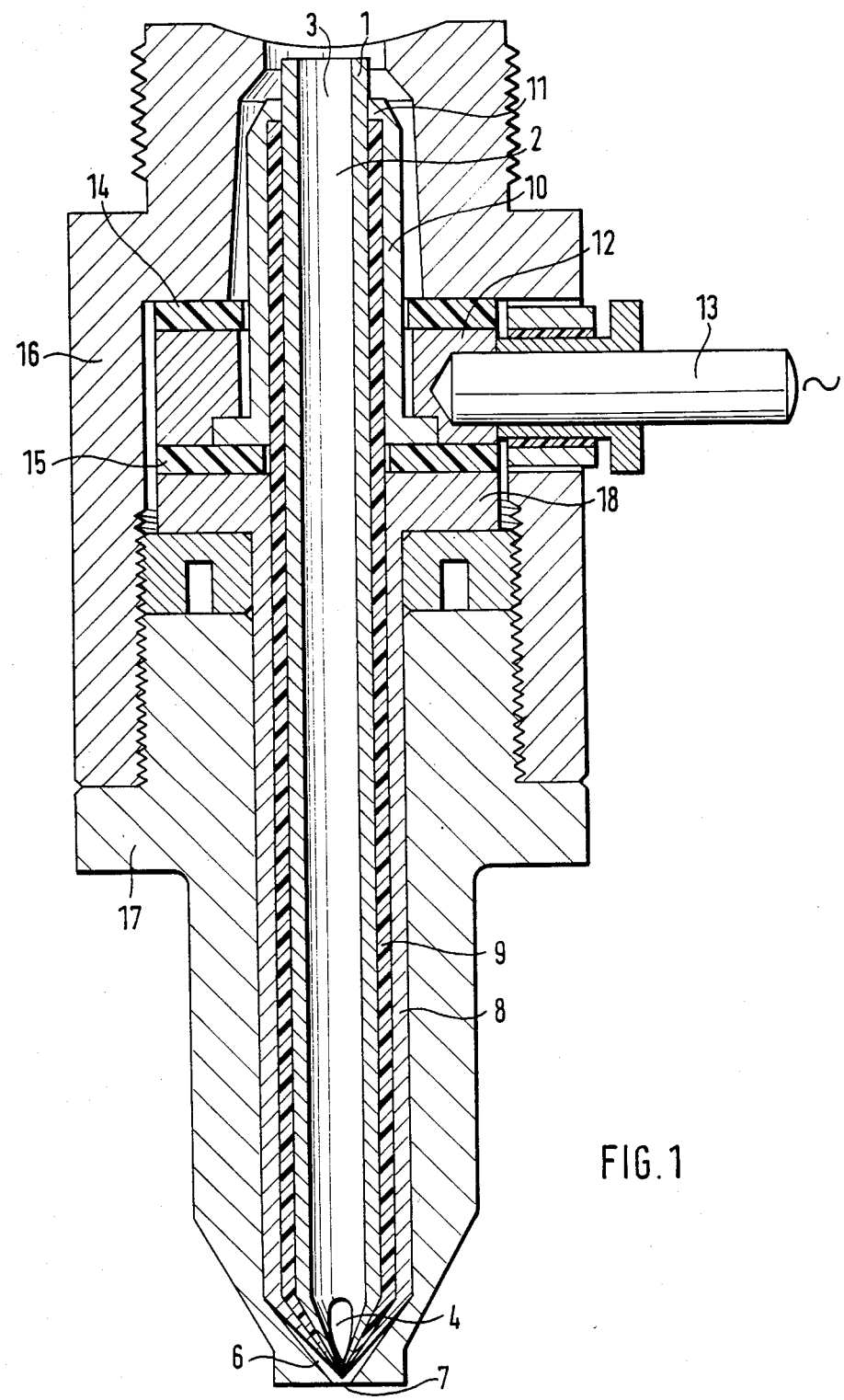
FIG. 1 is a vertical section through an electrically operated heating element.

Referring to FIG. 1, the heat conductor of the electrically operated heating element is a metal tube 1 made out of a material with a high specific electric resistance, a chrome-nickel steel for example. Metal tube 1 demarcates a flow channel 2 for the molten plastic introduced through an inflow aperture 3.

The flow channel 2 has the same cross-section over its total length except that it tapers at the downstream end into a point. In the vicinity of the point are flow-through apertures 4, whence the molten plastic arrives in a chamber 6 through outflow apertures 5 in the heating element, whence it flows in turn through a nozzle aperture 7.

Between metal tube 1 and outer jacket 8, which is welded to the tube in the vicinity of the point, is a layer 9 of insulation. Layer 9 extends beyond outer jacket 8 and also constitutes an intermediate layer between metal tube 1 and an upstream metal section 10 of outer jacket 8 that is welded at its outer end 11 to metal tube 1. Current is supplied to metal tube 1 through a plug 13, a connector disk 12, and jacket section 10. Connector disk 12 is mounted between insulating disks 14 and 15 in the top 16 of a housing. Top 16 is screwed to the bottom 17 of the housing, which accommodates a nozzle aperture 7. Insulating disk 15 rests on a flange 18 in outer jacket 8. Outer jacket 8 is made out of a material with low specific and effective electric resistances and can be made for example of structural or of another type of steel. Layer 9 of insulation is between 0.1 and 0.5 mm thick and can be made out of ceramic.

The metal tube 1 in the illustrated embodiment is shaped into a point at its downstream end and has flow-through apertures 4. As shown in FIGS. 2-4, outer jacket 8 has two webs 19 that are bent into a point and demarcate lateral outflow apertures 5. As will be evident from FIGS. 2 through 4, metal tube 1 is inserted into outer jacket 8 in such a way that webs 19 are displaced 90° with respect to flowthrough apertures 4. Once metal tube 1 has been completely inserted into outer jacket 8, webs 19 are attached to the point of the tube with welded seams 20 as is shown in FIG. 5.

Figure 5:
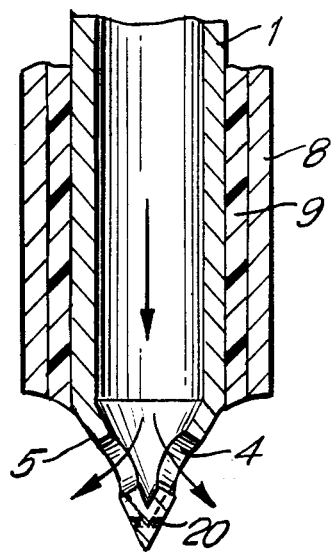
FIG. 5 is an enlarged vertical section through the end of the element of FIG. 1.

As shown in FIG. 5 no insulation is present between apertures 4 and 5.

The outer jacket 8 of the heating element rests against the wall of a bore in the bottom 17 of the housing. The bore narrows at the free end of bottom 17 into a chamber 6 that is provided with nozzle aperture 7.

It will be appreciated that the instant specification and claims are set forth by way of illustration and not limitation, and that various modifications and changes may be made without departing from the spirit and scope of the present invention.

What is claimed is:

1. In an electrically operated heating device with a flow channel for molten plastic and a central heating member that is connected to an outer jacket at the downstream end of the device, said end being provided with outflow apertures, the improvement wherein the heating member comprises a metal tube that demarcates the flow channel and wherein the downstream end thereof terminates in a point and has outflow apertures at the downstream end in the vicinity of the point, and wherein the outer jacket is composed of a material with low specific and effective electric resistance relative to the tube, and a layer of insulation disposed between the outer jacket and the tube.

2. The electrically operated heating device as in claim 1, the metal tube is shaped into a point at its downstream end with the flowthrough apertures and wherein the outer jacket has webs bent down and displaced 90° with respect to the flowthrough apertures and welded to the point of the tube.

3. The electrically operated heating device as in claim 1, wherein the layer of insulation between the outer jacket and the metal tube is between 0.1 and 0.5 mm thick.

4. The electrically operated heating device as in claim 1, wherein the metal tube is composed of a chrome-nickel steel and the outer jacket is composed of steel.

5. The electrically operated heating device as in claim 1, wherein the layer of insulation extends beyond the outer jacket and constitutes an intermediate layer between the metal tube and a section of the outer jacket that is connected at its outer end to the metal tube.

6. The electrically operated heating device as in claim 1, further comprising housing and wherein the outer jacket rests against the wall of a bore in the bottom of the housing, the bore narrowing at the free end into a chamber that is provided with a nozzle aperture.

* * * * *